(12) United States Patent
Lam et al.

(10) Patent No.: US 11,995,785 B2
(45) Date of Patent: May 28, 2024

(54) COMPUTER-IMPLEMENTED METHOD FOR PROVIDING A STANDARDIZED POSITION FOR ANATOMIC STRUCTURAL DATA OF A PATIENT SCAN

(71) Applicant: Ottobock SE & Co. KGaA, Duderstadt (DE)

(72) Inventors: Khoi Lam, Munich (DE); Max Thalmeier, Munich (DE)

(73) Assignee: Ottobock SE & Co. KGaA, Duderstadt (DE)

( * ) Notice: Subject to any disclaimer, the term of this patent is extended or adjusted under 35 U.S.C. 154(b) by 0 days.

(21) Appl. No.: 17/639,661

(22) PCT Filed: Sep. 10, 2019

(86) PCT No.: PCT/EP2019/074136
§ 371 (c)(1),
(2) Date: Mar. 2, 2022

(87) PCT Pub. No.: WO2021/047766
PCT Pub. Date: Mar. 18, 2021

(65) Prior Publication Data
US 2022/0292793 A1   Sep. 15, 2022

(51) Int. Cl.
*G06T 19/20*   (2011.01)
*G06T 7/00*    (2017.01)
*G06T 17/10*   (2006.01)

(52) U.S. Cl.
CPC ............ *G06T 19/20* (2013.01); *G06T 7/0012* (2013.01); *G06T 17/10* (2013.01); *G06T 2219/2004* (2013.01)

(58) Field of Classification Search
CPC . G06T 19/20; G06T 17/10; G06T 2219/2004; G06T 7/0012; G06T 7/70; G06F 3/0346; G06F 3/04815
See application file for complete search history.

(56) References Cited

U.S. PATENT DOCUMENTS 10,244,818 B2 *  4/2019  DesJardins ............ A43B 13/20
2014/0120319 A1 *  5/2014  Joseph ................. H04N 13/254
348/46

(Continued)

FOREIGN PATENT DOCUMENTS

EP    2359288 B1    6/2019
EP    3534279 A2    9/2019

(Continued)

OTHER PUBLICATIONS

Oliver Wasenmüller et al.: "Precise and Automatic Anthropometric Measurement Extraction Using Template Registration"; Oct. 2015; 7 pages.

(Continued)

*Primary Examiner* — Vijay Shankar

(57) ABSTRACT

The invention relates to a computer-implemented method for providing a standardized position for anatomic structural data (ASD) of a patient scan, in particular as a basis for individually fitting an orthosis or prosthesis to a first patient. The method comprises the steps of receiving anatomic structural data (ASD) of a body part of the first patient, receiving and/or selecting template structural data (TSD) corresponding to the body part and adapting the orientation and/or the pose of the anatomic structural data (ASD) using the armature of the template structural data (TSD). Further, the invention refers to a computer-implemented method for providing standardized measurement on anatomic structural data (ASD) of a patient scan, a data processing system and a computer-readable medium.

18 Claims, 3 Drawing Sheets

(56) References Cited

U.S. PATENT DOCUMENTS

2015/0237959 A1\* 8/2015 Wynn .................... A43B 17/14
                                                    12/146 M
2016/0037860 A1\* 2/2016 Holt ..................... A43B 13/186
                                                    12/146 B

FOREIGN PATENT DOCUMENTS

EP          3534279 A3     9/2019
WO       2011031971 A2    3/2011

OTHER PUBLICATIONS

Patent Cooperation Treaty: International Search Report and Written Opinion for PCT/EP2019/074136; Cornudet, Veronique; dated Apr. 29, 2020; 16 pages.

Vladislav Golyanik et al.: "A Framework for an Accurate Point Cloud Based Registration of Full 3D Human Body Scans"; Nagoya, Japan; May 8-12, 2017; 6 pages.

\* cited by examiner

COMPUTER-IMPLEMENTED METHOD FOR PROVIDING A STANDARDIZED POSITION FOR ANATOMIC STRUCTURAL DATA OF A PATIENT SCAN

CROSS-REFERENCE TO RELATED APPLICATIONS

This is application is a U.S. National Phase application submitted under 35 U.S.C. § 371 of Patent Cooperation Treaty application serial no. PCT/EP2019/074136, filed Sep. 10, 2019, and entitled COMPUTER-IMPLEMENTED METHOD FOR PROVIDING A STANDARDIZED POSITION FOR ANATOMIC STRUCTURAL DATA OF A PATIENT SCAN, COMPUTER-IMPLEMENTED METHOD FOR PERFORMING STANDARDIZED MEASUREMENT ON ANATOMIC STRUCTURAL DATA OF A PATIENT SCAN, DATA PROCESSING SYSTEM AND COMPUTER-READABLE MEDIUM, published as WO 2021/047766 A1, the specification of which is incorporated herein.

TECHNICAL FIELD

The invention refers to a computer-implemented method for providing a standardized position for anatomic structural data of a patient scan, in particular as a basis for individually fitting an orthosis or prosthesis to a first patient. Moreover, the invention refers to a computer-implemented method for performing standardized measurement on anatomic structural data of a patient scan, a data processing system and a computer-readable medium.

BACKGROUND

Usually, an orthosis or a prosthesis is individually manufactured and modified for a patient step by step. For this purpose, a functional form can be created which substitutes the patient's anatomy for fitting of the orthosis or prosthesis. In particular, e.g. a certified prosthetist/orthotist and/or an orthopaedic technician manually adapts the orthosis or prosthesis on basis of the anatomy/extremity of the patient itself, for example of the lower leg, or on basis of a functional form thereof. In this regard, the functional form of the patient's anatomy can be provided as a copy of the patient's anatomy being optionally thickened at relevant areas such as the ankles to provide a suitable basis for individually fitting of an orthosis or prosthesis. A digital illustration of the visualization of a three-dimensional structure of the scan data/the anatomic structural data of the patient can be of further assistance for the certified prosthetist/orthotist and/or the orthopaedic technician in this regard.

Nevertheless, such manual preparation and adaption of a patient specific orthosis or prosthesis not only necessitates time and thus is expensive, but also requires an extensive education and background knowledge by the certified prosthetist/orthotist and/or the orthopaedic technician, not only regarding the professional expertise but also with respect to the handling of appropriate software. Thus, certified prosthetists/orthotists and/or the orthopaedic technicians have to undergo additional training courses nowadays to handle usual working processes, in particular including different kinds of software programmes, for creating individually adapted orthosis or prosthesis digitally.

SUMMARY

One objective of the invention is to provide an improved method for planning and/or manufacturing an orthosis or prosthesis. In particular, it is an objective of the invention to provide an improved method for providing a basis for individually fitting an orthosis or prosthesis. Preferably, the orthosis and/or prosthesis are individually adapted and manufactured for the respective patient, whereby the process to prepare the basis for such individual handling is time efficient as well as cost efficient, easy to handle and provides a standardized starting point for an individually created/adapted orthosis or prosthesis. Furthermore, it is an objective of the invention to provide a computer-implemented method for providing measurement results from data of a patient scan, a data processing system and a computer-readable medium.

The present invention solves the objectives by providing a computer-implemented method according to claims 1 and 9, as well as a data processing system according to independent claim 12 and a computer-readable medium according to claim 14. Further preferred embodiments of the invention are described by the dependent claims respectively.

According to the present invention a computer-implemented method for providing a standardized position of a patient scan is provided, in particular as a basis for individually fitting an orthosis or prosthesis to a (first) patient, comprising the following steps:

a. receiving of anatomic structural data of the (first) patient, whereby the anatomic structural data comprise surface data of a body part of the first patient resulting from the patient scan;

b. receiving of template structural data corresponding to the body part being represented by the anatomic structural data of the first patient, whereby the template structural data comprise surface data and an armature to simulate mechanical deformation of the surface data;

c. adapting the orientation and/or the pose of the anatomic structural data to align the anatomic structural data with the template structural data, comprising the following steps:

providing a mechanical deformation to the template structural data to achieve a maximum similarity with the pose of the anatomic structural data;

coupling the anatomic structural data with the armature of the template structural data such that the pose of the anatomic structural data can be adapted by movement of the armature.

Alternatively, the underlying objectives can be solved according to the present invention by a computer-implemented method for providing a standardized position for anatomic structural data of a patient scan, in particular as a basis for individually fitting an orthosis or prosthesis to a first patient, comprising the following steps:

a. receiving of anatomic structural data of a body part of the first patient, whereby the anatomic structural data comprise surface data of the body part from the patient scan;

b. receiving of and/or selecting template structural data corresponding to the body part, whereby the template structural data comprise surface data and an armature to define, in particular to limit, mechanical deformation, in particular of the surface data;

c. adapting the orientation and/or the pose of the anatomic structural data using the armature of the template structural data, comprising the following steps:

providing a mechanical deformation to the template structural data to achieve a (maximum) similarity with the pose of the anatomic structural data;

coupling the anatomic structural data, in particular the surface data of the the anatomic structural data, with the mechanically deformed template structural data, in particular the armature of the mechanically deformed template structural data, such that the pose of the anatomic structural data can be adapted using the armature.

The present invention is based on the idea to prepare anatomic structural data of the first patient, preferably received from a patient scan of a respective anatomy such as a lower leg of the first patient, to be oriented and comprise a pose which is standardized. Thus, further handling and fitting, as well as processing measurements on the data of the patient scan/the anatomic structural data is simplified for the certified prosthetist/orthotist and/or the orthopaedic technician.

In particular, severe problems for further handling/automatized handling of the data being caused by the orientation and/or pose of the anatomic structural data resulting from a patient scan of a patient can be avoided. Thus, inappropriate orientation and posture of anatomic structural data causing additional efforts to realign/modify the data manually as well as inaccuracies of the resulting individually fitted orthosis or prosthesis are resolved by the present invention.

Preferably, the anatomic structural data is provided by a patient scan, in particular by a three-dimensional scan of an anatomy/extremity of the first patient such as a lower leg. In the sense of the present invention, anatomic structural data and template structural data can be considered as two- or three-dimensional data sets.

The template structural data represents an exemplary data set of the same or similar body part/extremity which the provided anatomic structural data of the first patient represent. In one embodiment, the anatomic structural data and the template structural data refer to a body part/extremity of the same category, e.g. a left lower leg or a right lower leg. Alternatively, there can be one set of template structural data for symmetrical body parts, e.g. left and right lower leg.

In particular, the template structural data refer to a preferably three-dimensional data set in a standardized position and thus representing a standard with regard to its spatial orientation and pose in all three dimensions. Exemplarily, the template data set of a right lower leg is standardized in its spatial position with regard to coordinate axis as well as the lower leg, in particular the tibial part and the foot are standardized in their pose relative to each other.

By modifying the orientation and/or the pose of the anatomic structural data of the first patient on basis of the template structural data, a standardization of the position of the anatomic structural data resulting from a patient scan can be provided, in particular as a basis for further handling of the anatomic structural data.

In the sense of the present invention, the pose of the anatomic structural data preferably describes the relative position of single, characteristic parts of the first patient's anatomy, such as e.g. the positioning of the tibial part and the foot of a lower leg relative to each other. The orientation of the anatomic structural data preferably describes its spatial position, in particular relative to the template structural data.

By providing a standardized position of the anatomic structural data, its posture as well as it spatial orientation are standardized, in particular to provide a solid basis for further handling of the data.

According to a preferred embodiment, step a) and/or step b) further comprise:

defining corresponding landmark points along the anatomic structural data and/or the template structural data.

In particular, landmark points can be defined at characteristic positions of the body part/anatomy.

Further, an arbitrary amount of characteristic landmark points being manually or automatically defined on the anatomic structural data of the first patient and the template structural data can be used, e.g. a maximum of 30, 25, 20, 15, 10, 5 or 3 landmark points. Most preferably, a minimum of 5 or more landmark points are used.

Furthermore, it is of advantage to use as less landmark points as possible, due to the correlation of an increasing amount of characteristic parameter with the increasing amount of necessary data. Thus, a large amount of e.g. landmark points will necessitate more data and will result in longer processing times consequently.

In another embodiment of the invention, adapting the orientation according to step c) further comprises:

applying a first rigid point cloud registration algorithm, in particular an iterative-closest-point (ICP) algorithm, to the landmark points of the anatomic structural data, and/or applying a second non-rigid point cloud registration algorithm, in particular a scaling-iterative-closest-point (SCIP) algorithm, to the template structural data, such that the distance between corresponding landmark points of the anatomic structural data and of the template structural data is minimized respectively.

Thus, the position/orientation of the anatomic structural data can be adapted to match the template structural data on a step-by-step basis. Further, the spatial size of the anatomic structural data and of the template structural data can be adapted by scaling the spatial size of the template structural data on as step-by-step basis.

In consequence, the distance between landmark points of the anatomic structural data and of the template structural data is minimized by adapting the orientation/spatial position as well as the spatial size, preferably in an iterative manner. In particular, the sum of distances between the landmark points of the anatomic structural data and the template structural data is minimized.

In one preferred embodiment, step c) further comprises:

identifying a first characteristic part of the anatomic structural data and the template structural data, aligning the first characteristic part of the anatomic structural data with the first characteristic part of the template structural data by applying the first rigid point cloud registration algorithm, whereby the first characteristic part of the anatomic structural data is aligned with the first characteristic part of the template structural data in advance to an adaption, in particular a standardization, of the pose of the anatomic structural data of the first patient, in particular in advance to a mechanical deformation of the template structural data and/or the anatomic structural data.

The first characteristic part of the anatomic structural data and the template structural data can be the foot of a lower leg, the sole of the foot or the like, in particular the points/landmark points of the anatomic/template structural data respectively. The first characteristic part can be identified e.g. by a specific set of landmark points or can be identified manually by the certified prosthetist/orthotist and/or the orthopaedic technician.

By fixating the first characteristic part of the anatomic structural data, remaining parts thereof can be modified with regard to its pose in relation to the first characteristic part.

Furthermore, in the sense of the present invention, the alignment of the anatomic structural data and the template structural data by applying a rigid point cloud registration algorithm preferably refers to a reduction/minimization of the sum of distances between corresponding landmark points of the anatomic structural data and the template structural data.

In another embodiment, the method, in particular step c), further comprises the steps:
- determining a transfer element between a second characteristic part, in particular a tibial part, of the anatomic structural data and a second characteristic part of the template structural data;
- coupling the anatomic structural data (ASD) to the armature of the template structural data (TSD),
- applying the transfer element, in particular as an inverse transfer element, to the anatomic structural data, in particular to the armature being coupled with the anatomic structural data, whereby the anatomic structural data is rotated in combination with the armature, in particular only the second characteristic part (CP2-ASD) of the anatomic structural data (ASD) is rotated by the armature, such that the anatomic structural data of the first patient is provided in a standardized posture.

A second characteristic part of the anatomic structural data and the template structural data can be the tibial part of a lower leg, in particular the (landmark) points corresponding to the tibial part of a lower leg. Thus, by modifying the pose of the anatomic structural data, e.g. the relative position between the tibial part as second characteristic part and the foot as first characteristic part of a first patient's lower leg can be adapted.

Advantageously, a standardized posture of the anatomic structural data can be achieved, independent from the posture of the first patient's body part/extremity during the patient scan.

In one preferred embodiment, the standardized pose of the anatomic structural data comprises an angle of 90° between the first and second characteristic part of the anatomic structural data of the first patient.

According to another embodiment, the transfer element is a vector for pose adaption of at least a part of the anatomic structural data of the first patient, in particular for adaption/correction/standardization of the pose of the second characteristic part, e.g. a tibial part, of the anatomic structural data in relation to the first characteristic part, e.g. a foot.

In one embodiment, the method further comprises the following steps:
- illustrating at least a visualization of a first three-dimensional structure of the anatomic structural data of the first patient, and/or
- illustrating at least a visualization of a second three-dimensional structure of the template structural data.

In particular, the anatomic structural data of the first patient as well as the template structural data can be visualized as three-dimensional structures and thus illustrated e.g. by a display or the like.

Thus, the patient's anatomy/extremity on basis of the anatomic structural data as well as the template structural data can be visually evaluated, e.g. by the first patient and/or the certified prosthetist/orthotist and/or the orthopaedic technician.

In one further aspect of the invention a computer-implemented method for performing standardized measurement on anatomic structural data of a patient scan, in particular as a basis for individually fitting an orthosis or prosthesis to a first patient, comprising the following steps:
a. receiving of anatomic structural data of the body part of the first patient;
b. receiving of and/or selecting template structural data corresponding to the body part;
c. adapting the orientation and/or the pose of the anatomic structural data to a standardized position, preferably by the method according to the present invention;
d. identifying at least one intersection between the anatomic structural data and at least one pre-determined section plane of the template structural data;
e. processing at least one standardized measurement along the at least one intersection to receive at least one measurement value of the anatomic structural data of the first patient, in particular a circumference, a length or the like.

The at least one standardized measurement is based on the intersection/overlap of the at least one section plane of the template structural data with the anatomic structural data. Thus, the value of a circumference of the anatomic structural data, a length, a volume of the cross-section or the like can be determined.

By providing a standardized position of the anatomic structural data in advance to the measurement, the measurement accuracy can be improved by such a standardized measurement.

In one preferred embodiment, the method further comprises:
- providing a measurement form, in particular a measurement sheet, which identifies at least one measurement parameter, whereby the at least one received measurement value of the first patient corresponds to the at least one measurement parameter.

In another embodiment the at least one section plane of the template structural data is pre-determined on basis of the measurement form, in particular on basis of the at least one measurement parameter as provided by the measurement form.

The measurement form preferably is a sheet for measurements along a body part/extremity, such as a lower leg, identifying specific measurement parameters being of interest for certified prosthetist/orthotist and/or an orthopaedic technician. The at least one section plane of the template structural data can be pre-defined according to the measurement form.

Consequently, standardized measurements and measurement values of the anatomic structural data of the first patient can be provided. The standardization of the measurement, due to standardized position of the anatomic structural data as well as standardized measurement parameters, allow a high and constant accuracy for anatomic structural data of multiple different patients.

According to an/another aspect of the invention, a data processing system is provided which comprises means for carrying out the steps of the method of one of the preceding claims.

In one embodiment at least one client and at least one server is provided, whereby the client is capable of sending the anatomic structural data of the first patient to the server and receiving the measurement values of the first patient from the server, and whereby at least one server is capable of:
- receiving the anatomic structural data of the first patient from the client, adapting the orientation and/or the pose of the anatomic structural data in relation to the template structural data, processing at least one standardized measurement along the anatomic structural data of the first patient, providing at least one measurement value of the anatomic structural data of the first patient to the client, preferably in form of a completed measurement form comprising the at least one measurement value.

In a further aspect, the invention refers to a computer-readable medium comprising instructions which, when executed by a computer, cause the computer to carry out the steps of at least one of the methods according to the present invention.

Thus, in the sense of the present invention a method/apparatus can be provided wherein manufacturing data is derived from anatomic structural data comprising an adapted orientation and/or pose, in particular to be arranged in a standardized position, and wherein an orthosis/prosthesis is produced in accordance with the manufacturing data.

BRIEF DESCRIPTION OF THE DRAWINGS

In the following, the present invention is described in more detail by referring to the comprised figures. However, further conceivable examples of the present invention shall not be excluded thereby.

The figures schematically illustrate.

DETAILED DESCRIPTION

Figure 1:
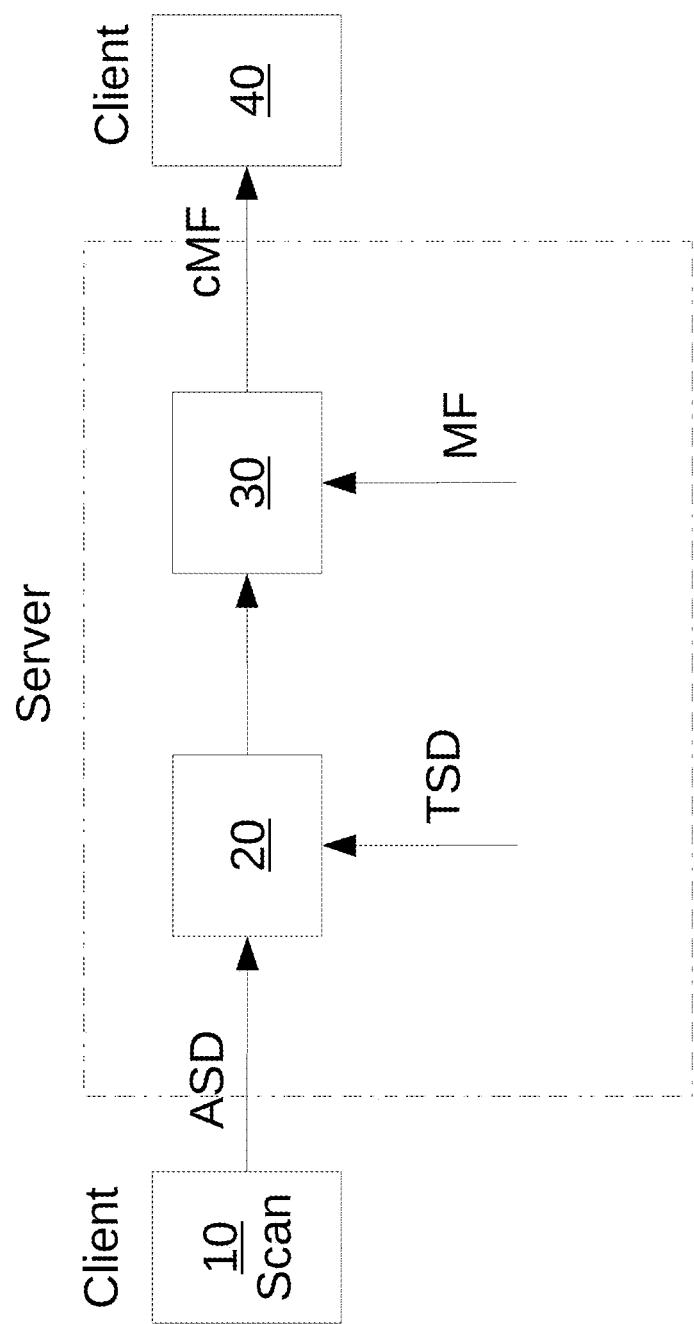
FIG. 1 illustrates an exemplary flow chart of a method for providing measurement results from anatomic structural data of a patient scan in a standardized position.

FIG. 1 illustrates an exemplary method for providing measurement results from anatomic structural data ASD of a patient scan, the measurement results being in accordance with a standardized position and/or alignment/orientation.

In a first step, a patient scan 10 of an anatomy/extremity of a patient is provided to achieve anatomic structural data ASD, e.g. of a lower leg of the first patient. The patient scan 10 can be acquired/generated by a client being located at a premise of the first patient and/or a certified prosthetist/orthotist and/or an orthopaedic technician.

Afterwards, the anatomic structural data ASD are provided to a server for further processing.

In particular, in a second step, a computer added adaption of the (spatial) orientation and/or the pose 20 of the anatomic structural data ASD is performed. For this purpose, template structural data TSD comprising a standardized position is loaded/provided, preferably by the server.

In the illustrated embodiment, the server can comprise template structural data TSD for different body parts/extremities. The respective template structural data TSD is chosen automatically by the server or manually on basis of the anatomic structural data ASD representing a patient scan ASD of e.g. a right or left lower leg of the first patient. In one embodiment, template structural data TSD is selected based on a user input.

The template structural data TSD can further comprise an arbitrary amount of landmark points, e.g. less than 20 or less than 10 landmarks and preferably at least 5 landmark points. Such landmark points can automatically and/or manually defined for the anatomic structural data ASD as well in order to provide corresponding landmark points in comparison to the template structural data TSD. Preferably, the landmarks are defined by and/or assigned to a particular set of template structural data TSD.

In a next step, standardized measurements 30 can be processed on the aligned/re-positioned anatomic structural data ASD. The standardization of measurements is achieved by providing a standardized position, referring to a spatial orientation and pose, of the anatomic structural data.

Further, the server can comprise multiple measurement forms MF, preferably in form of measurement sheets and/or tables, for different body parts which specify relevant measurement parameters for a certified prosthetist/orthotist and/or an orthopaedic technician. Thus, the respective measurement form MF can be provided by the server on basis of the body part/anatomy represented by the anatomic structural data ASD of the first patient. In one embodiment, the points between which measurements are taken and/or the planes used for extracting certain measurements are stored together with the template structural data TSD. In other words, the template structural data TSD can not only be used to align/re-arrange the anatomic structural data ASD but to identify landmarks and/or at least a plane to calculate/measure said measurements e.g. for the measurement form MF. Obviously, the measurement form MF is not mandatory. The measurements can be used/processed without involving the measurement from MF.

By using the respective measurement form MF, a further standardization of the measurements on the anatomic structural data ASD is achieved. In particular, the standardized measurements can be performed automatically on this basis. Thus, also the measurement form MF can be filled/completed automatically.

In a final step, the completed measurement form cMF is provided to/received by the client 40 and can be reviewed by the first patient and/or the certified prosthetist/orthotist and/or an orthopaedic technician at the local premises.

FIGS. 2a to 2f show a process to adapt anatomic structural data ASD of a first patient to a standardized position in which the measurements are taken.

Figure 2:
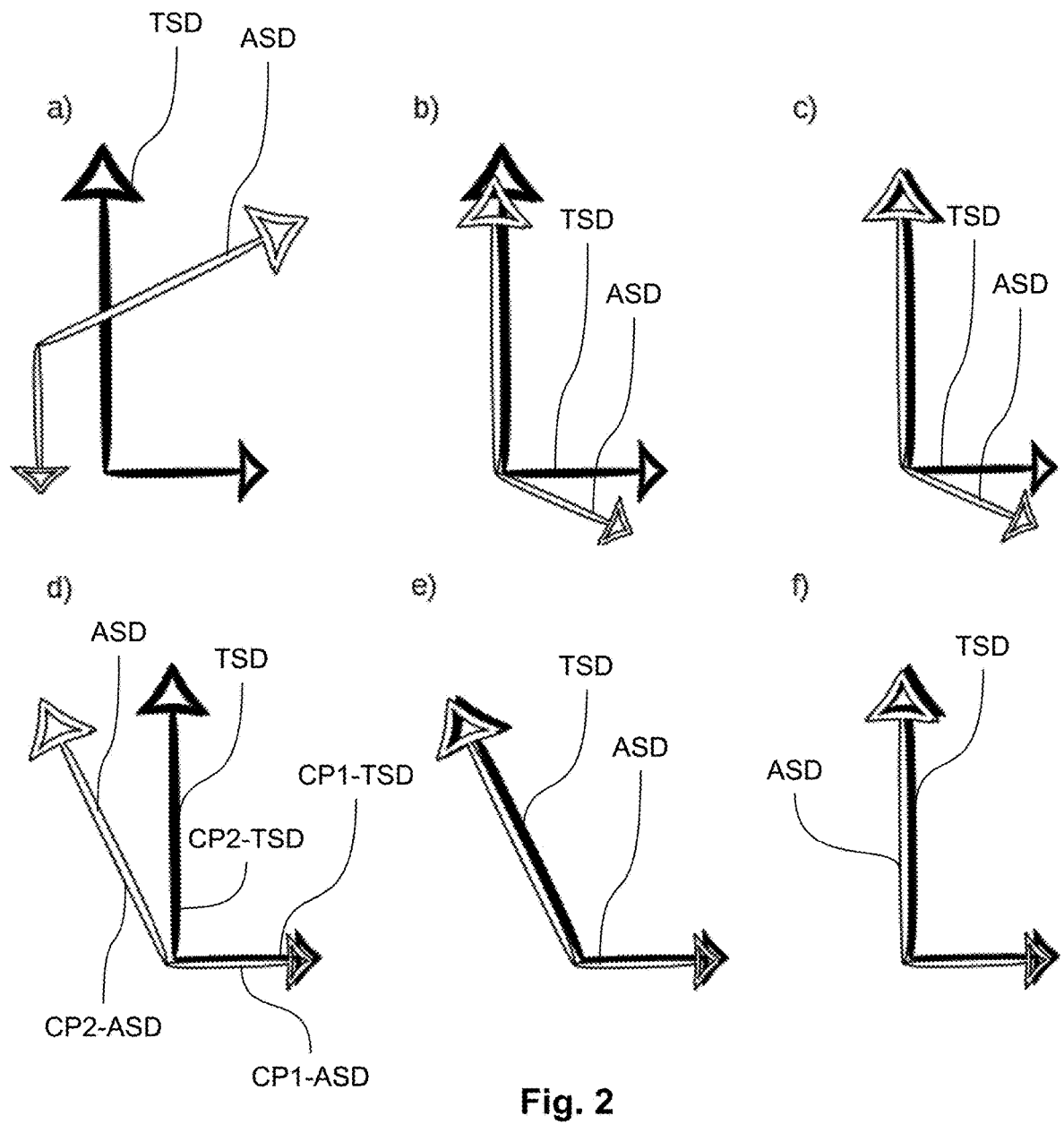
FIG. 2a-2f illustrates a process to adapt anatomic structural data to a standardized position.

FIG. 2a illustrates the original arrangement of the template structural data TSD and the anatomic structural data ASD as received from a patient scan 10. In this step, landmark points can be defined automatically and/or manually on the anatomic structural data. Preferably, the template structural data TSD already comprises such landmark points after an initial definition in advance to the use of the data set.

In FIG. 2b a first rigid point cloud registration algorithm, preferably an iterative-closest-point (ICP) algorithm, is applied to the anatomic structural data ASD of the first patient. By applying the first rigid point cloud registration algorithm distances between corresponding landmark points of the anatomic structural data ASD and of the template structural data TSD are minimized by shifting/relocating the anatomic structural data. In particular, the sum of distances between landmark points can be reduced/minimized. Thus, a preliminary alignment of the anatomic structural data ASD of the first patient with the template structural data TSD is achieved, preferably on an iterative and thus step-by-step basis.

FIG. 2c shows a rescaling of the template structural data TSD by applying a second non-rigid point cloud registration algorithm, in particular a scaling-iterative-closest-point (SICP) algorithm, to the template structural data TSD. In this course, the template structural data TSD is re-scaled such that distances, in particular the sum of distances, between landmark points of the anatomic structural data ASD and the template structural data TSD are minimized.

In FIG. 2d first characteristic parts CP1-ASD; CP1-TSD of the anatomic structural data and of the template structural data TSD are identified and aligned with each other by applying the first rigid point cloud registration algorithm to the anatomical structural data ASD, in particular to the landmark points of the anatomic structural data ASD, in order to minimize the distances between landmark points.

In FIG. 2e a transfer element, preferably in form of a transfer vector, is determined to align the second characteristic parts CP2-TSD; CP2-ASD of the template structural data TSD and the anatomic structural data ASD with each other, whereby the first characteristic parts CP1-ASD; CP1; TSD remain in alignment with each other. Thus, a transfer element is achieved which indicates a necessary transformation of the anatomic structural data ASD, in particular of the second characteristic part CP2-ASD of the anatomic structural data ASD, in order to provide a standardized posture, particularly referring to a standardized angular arrangement of the first and second characteristic part CP1-ASD; CP2-ASD of the anatomic structural data ASD.

Subsequently, the anatomic structural data ASD can be coupled to an armature of the template structural data TSD such that the anatomic structural data ASD is spatially fixed. Thus, the first and second characteristic parts CP1-ASD; CP2-ASD; CP1-TSD; CP2-TSD of the anatomic structural data ASD and of the template structural data TSD can both be spatially fixed to the armature. Alternatively, by coupling the anatomic structural data ASD to the armature, the template structural data TSD can be decoupled from the armature and thus revert back to its original pose, in particular the standardized pose.

FIG. 2f illustrates the standardized position of the anatomic structural data ASD in alignment with the template structural data TSD after applying the inverse transfer element, in particular the inverse transfer vector, to the anatomic structural data ASD, in particular to the armature being coupled to the anatomic structural data ASD. In consequence, the second characteristic part CP2-ASD of the anatomic structural data is rotated in order to align with the second characteristic part CP2-TSD of the template structural data TSD. A pose adaption/correction is provided to the anatomic structural data ASD, in particular to achieve a standardized pose of the anatomic structural data ASD.

Preferably, an angle of 90° between the first and second characteristic part CP1-ASD; CP2-ASD, e.g. a foot and a tibial part, of the anatomic structural data ASD is achieved as standardized posture.

Finally, the anatomic structural data ASD is adapted and modified in its spatial orientation and pose to align with the template structural data TSD and thus is transformed to a standardized position.

Figure 3:
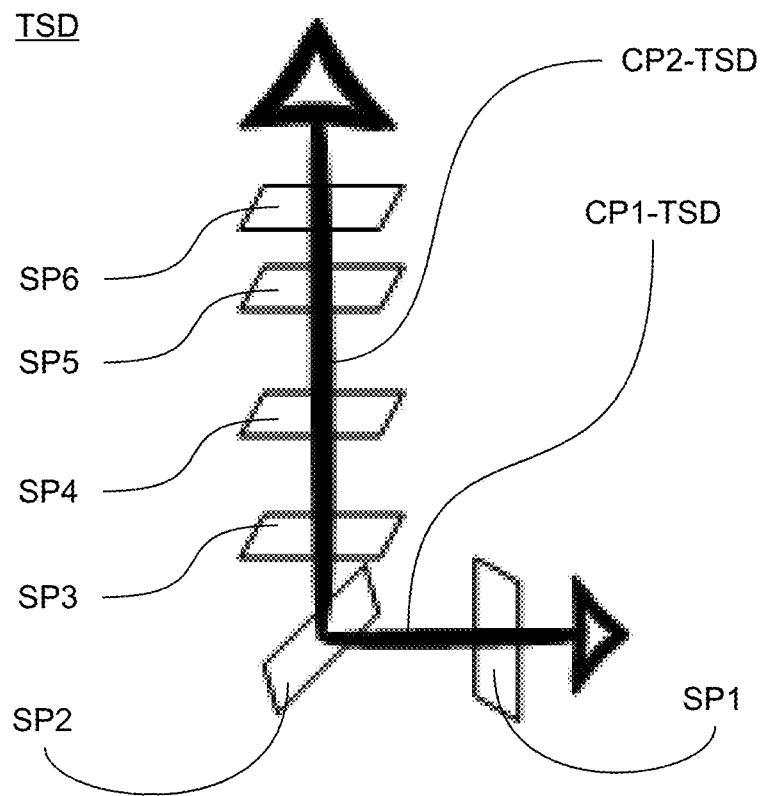
FIG. 3 illustrates template structural data comprising multiple section planes.

FIG. 3 shows a template structural data TSD comprising multiple section planes SP1; SP2; SP3; SP4; SP5; SP6.

If anatomic structural data are adapted to comprise a standardized position as illustrated in FIG. 2f, the section planes SP1; SP2; SP3; SP4; SP5; SP6 of the template structural data TSD can be used to provide standardized measurements on the anatomic structural data ASD.

In particular, standardized measurements 30 according to FIG. 1 can be performed at the overlaps/intersections of the section planes SP1; SP2; SP3; SP4; SP5; SP6 with the anatomic structural data ASD. Thus, circumferences, lengths, cross-section volumes or the like of the anatomic structural data ASD of the first patient can be measured in a standardized manner.

According to FIG. 3, the section planes SP1; SP2; SP3; SP4; SP5; SP6 as preferably specified by the measurement form/measurement guidelines are distributed along the first characteristic part CP1-TSD as well as the second characteristic part CP2-TSD of the template structural data. Further, the second section plane SP2 is arranged in the contact area of the first and second characteristic part CP1-TSD; CP2-TSD of the template structural data TSD.

The section planes SP1; SP2; SP3; SP4; SP5; SP6 can be arranged orthogonal to a coordinate axis of the template structural data TSD or in an angular manner, such as e.g. shown for the second plane SP2. Thus, arbitrary standardized measurements along the anatomic structural data of a first patient and on basis of the section planes SP1; SP2; SP3; SP4; SP5; SP6 can be provided.

In summary, the present invention provides an automatized repositioning, in particular re-orientation and reconfiguration of the posture, of the anatomic structural data of the first patient in order to ensure a standardized position of the anatomic structural data for further handling thereof. Thus, a common and solid basis for manufacturing patient-individual prosthesis or orthosis is achieved.

Furthermore, the present invention provides a standardized measurement based on the standardized position of the anatomic structural data and section planes, preferably being based on a measurement form for the specific anatomy/body part/extremity such as a lower leg. Thus, also a standardization of automated measurements with high accuracy being processed on the anatomic structural data of various patients can be ensured.

Consequently, an automatized standardization for handling of anatomic structural data resulting from a patient scan is achieved.

REFERENCE NUMERALS

10 Patient scan
20 Adapting orientation and/or pose
30 Standardized measurement
40 Providing/Receiving completed measurement form (cMF)
ASD Anatomic structural data
CP1-ASD First characteristic part of ASD, e.g. foot
CP1-TSD First characteristic part of TSD, e.g. foot
CP2-ASD Second characteristic part of ASD, e.g. tibial part
CP2-TSD Second characteristic part of TSD, e.g. tibial part
cMF Completed measurement form
MF Measurement form
SP1-SP6 Section planes (of the template structural data)
TSD Template structural data

The invention claimed is:

1. A method for performing standardized measurement on anatomic structural data (ASD) of a patient scan, in particular as a basis for individually fitting an orthosis or prosthesis to a first patient,
comprising:
a) receiving anatomic structural data (ASD) of a body part of the first patient wherein the anatomic structural data (ASD) comprise surface data of the body part from the patient scan;
b) receiving and/or selecting template structural data (TSD) corresponding to the body part, wherein the template structural data (TSD) comprise surface data and an armature to define mechanical deformation of the surface data;

c) adapting an orientation and/or a pose of the anatomic structural data (ASD) to a standardized spatial orientation and pose using the armature of the template structural data (TSD), by:
  providing a mechanical deformation to the template structural data (TSD) to achieve a maximum similarity with the pose of the anatomic structural data (ASD), by applying a rigid point cloud registration algorithm to landmark points of the anatomic structural data (ASD) such that a distance between corresponding landmark points of the anatomic structural data (ASD) and of the template structural data (TSD) is minimized,
  determining a transfer element between a second characteristic part (CP2-ASD) of the anatomic structural data (ASD) and a second characteristic part (CP2-TSD) of the template structural data (TSD), and
  coupling the surface data of the anatomic structural data (ASD) with the armature of the mechanically deformed template structural data (TSD), such that the pose of the anatomic structural data (ASD) can be adapted using the armature by applying the transfer element as an inverse transfer element to the armature being coupled with the anatomic structural data (ASD),
  wherein the anatomic structural data (ASD) is rotated in combination with the armature, such that the anatomic structural data (ASD) of the first patient is provided in the standardized spatial orientation and pose;
d) identifying at least one intersection between the anatomic structural data (ASD) and at least one pre-determined section plane (SP1; SP2; SP3; SP4; SP5, SP6) of the template structural data (TSD); and
e) processing at least one standardized measurement along the at least one intersection to receive at least one measurement value of the anatomic structural data (ASD) of the first patient.

2. The method according to claim 1,
characterized in that
the method further comprises:
  providing a measurement form (MF) which identifies at least one measurement parameter,
  wherein the at least one received measurement value of the anatomic structural data (ASD) of the first patient corresponds to the at least one measurement parameter.

3. The method according to claim 2,
characterized in that
the at least one pre-determined section plane (SP1; SP2; SP3; SP4; SP5, SP6) of the template structural data (TSD) is pre-determined on the basis of the measurement form (MF).

4. The method according to claim 3, characterized in that the at least one pre-determined section plane (SP1; SP2; SP3; SP4; SP5, SP6) of the template structural data (TSD) is pre-determined on the basis of the at least one measurement parameter as provided by the measurement form (MF).

5. The method according to claim 2, characterized in that the measurement form (MF) is a measurement sheet.

6. A data processing system comprising means for carrying out the method of claim 1.

7. The data processing system according to claim 6, characterized in that
at least one client and at least one server is provided,
wherein the client is configured to send the anatomic structural data (ASD) of the first patient to the server and receive the at least one measurement value of the anatomic structural data (ASD) of the first patient from the server, and
wherein the at least one server is configured to:
  receive the anatomic structural data (ASD) of the first patient from the client,
  adapt the orientation and/or the pose of the anatomic structural data (ASD) in relation to the template structural data (TSD),
  process at least one standardized measurement along the anatomic structural data (ASD) of the first patient, and
  provide the at least one measurement value of the anatomic structural data (ASD) of the first patient to the client.

8. The data processing system according to claim 7, characterized in that the at least one server is configured to provide the at least one measurement value of the anatomic structural data (ASD) of the first patient to the client as a completed measurement form (cMF) comprising the at least one measurement value.

9. A method for providing a standardized spatial orientation and pose for anatomic structural data (ASD) of a patient scan, in particular as a basis for individually fitting an orthosis or prosthesis to a first patient, the method comprising:
a) receiving anatomic structural data (ASD) of a body part of the first patient, wherein the anatomic structural data (ASD) comprise surface data of the body part from the patient scan;
b) receiving and/or selecting template structural data (TSD) corresponding to the body part,
  wherein the template structural data (TSD) comprise surface data and an armature to define mechanical deformation of the surface data; and
c) adapting an orientation and/or a pose of the anatomic structural data (ASD) to the standardized spatial orientation and pose using the armature of the template structural data (TSD), by:
  providing a mechanical deformation to the template structural data (TSD) to achieve a maximum similarity with the pose of the anatomic structural data (ASD), by applying a rigid point cloud registration algorithm to landmark points of the anatomic structural data (ASD) such that a distance between corresponding landmark points of the anatomic structural data (ASD) and of the template structural data (TSD) is minimized,
  determining a transfer element between a second characteristic part (CP2-ASD) of the anatomic structural data (ASD) and a second characteristic part (CP2-TSD) of the template structural data (TSD), and
  coupling the surface data of the anatomic structural data (ASD) with the armature of the mechanically deformed template structural data (TSD), such that the pose of the anatomic structural data (ASD) can be adapted using the armature by applying the transfer element as an inverse transfer element to the armature being coupled with the anatomic structural data (ASD),
  wherein the anatomic structural data (ASD) is rotated in combination with the armature, such that the anatomic structural data (ASD) of the first patient is provided in the standardized spatial orientation and pose, wherein step a) and step b) further comprise defining the corresponding landmark points along the anatomic structural data (ASD) and the template structural data (TSD).

10. The method according to claim 1, characterized in that the at least one measurement value of the anatomic structural data (ASD) of the first patient is a circumference or a length.

11. A non-transitory computer-readable medium comprising instructions which, when executed by a computer, cause the computer to perform the method of claim 9.

12. The method according to claim 9,
characterized in that
adapting the orientation according to step c) further comprises:
applying an iterative-closest-point algorithm as a first rigid point cloud registration algorithm to the landmark points of the anatomic structural data (ASD), and/or
applying a scaling-iterative-closest-point algorithm as a second non-rigid point cloud registration algorithm to the template structural data (TSD),
such that the distance between corresponding landmark points of the anatomic structural data (ASD) and of the template structural data (TSD) is minimized.

13. The method according to claim 12,
characterized in that
step c) further comprises:
identifying a first characteristic part (CP1-ASD) of the anatomic structural data (ASD) and a first characteristic part (CP1-TSD) of the template structural data (TSD), and
aligning the first characteristic part (CP1-ASD) of the anatomic structural data (ASD) with the first characteristic part (CP1-TSD) of the template structural data (TSD) by applying the first rigid point cloud registration algorithm,
wherein the first characteristic part (CP1-ASD) of the anatomic structural data (ASD) is aligned with the first characteristic part (CP1-TSD) of the template structural data (TSD) in advance of an adaptation of the pose of the anatomic structural data (ASD) of the first patient.

14. The method according to claim 13,
characterized in that
only the second characteristic part (CP2-ASD) of the anatomic structural data (ASD) is rotated by the armature, such that the anatomic structural data (ASD) of the first patient is provided in the standardized pose.

15. The method according to claim 14,
characterized in that
the standardized pose of the anatomic structural data (ASD) comprises an angle of 90° between the first and second characteristic parts (CP1-ASD; CP2-ASD) of the anatomic structural data (ASD) of the first patient.

16. The method according to claim 14,
characterized in that
the transfer element is a vector for pose adaption of at least a part of the anatomic structural data (ASD) of the first patient.

17. The method according to claim 13, characterized in that the adaptation of the pose of the anatomic structural data (ASD) of the first patient comprises a mechanical deformation of the template structural data (TSD) and/or the anatomic structural data (ASD).

18. The method according to claim 9,
characterized in that
the method further comprises:
illustrating at least a visualization of a first three-dimensional structure of the anatomic structural data (ASD) of the first patient, and/or
illustrating at least a visualization of a second three-dimensional structure of the template structural data (TSD).

* * * * *